Patented July 7, 1936

2,047,146

UNITED STATES PATENT OFFICE 2,047,146

THERMOPLASTIC COMPOSITION

William Koch, Wilmington, Del., assignor to Hercules Powder Company, Wilmington, Del., a corporation of Delaware No Drawing. Original application August 8, 1932, Serial No. 627,990. Divided and this application March 14, 1934, Serial No. 715,473

7 Claims. (Cl. 106—23)

This invention relates to an improvement in thermoplastic composition. More particularly the thermoplastic composition in accordance with this invention includes as essential ingredients chlorinated rubber and a solvent softener. The composition may include various additional ingredients the precise nature of which will be dictated by desire or the use for which the composition is intended with, of course, consideration for essential ingredients. Thus, the composition may, for example, include pigments of various kinds, fillers, as wood flour, mica, etc., oils, as castor oil, linseed oil, wood oil, etc., gums or resins, as ethyl abietate, methyl abietate, ester gum, etc., and other desirable ingredients not incompatible with the essential ingredients of the composition.

The composition in accordance with this invention may include chlorinated rubber and a solvent softener in widely varying proportions depending upon the characteristics desired for the final composition. Thus, by way of illustration desirable compositions may be prepared with, for example, 33–50% by weight of chlorinated rubber and 50–67% by weight of solvent softener. Such other ingredients as may be included in the composition will be included in various amounts such as to effectuate the purpose of their inclusion.

In forming the composition, the essential ingredients, chlorinated rubber and solvent softener, will be heated together at any suitable temperature until blended. Thus, by way of illustration the ingredients may be heated together at a temperature of say, for example, within the range 100–120° C. until they blend. While it will be understood that the temperature range given by way of illustration is not intended as limiting, it will be found generally undesirable to use a temperature over about 120° C., where color of the composition is of importance, since higher temperatures, while usable, will cause discoloration.

Of the essential ingredients of the composition in accordance with this invention the chlorinated rubber may be either chlorinated raw rubber or chlorinated vulcanized rubber, or mixtures thereof, both being contemplated as within the term "chlorinated rubber". While the chlorinated rubber will preferably have a relatively high percentage of chlorine, say above 67%, it will be understood that rubber containing any substantial percentage of chlorine, say as low as 50%, will be usable.

The chlorinated rubber, either raw or vulcanized, may be obtained from any source, or may be produced in any suitable manner. Thus, for example, suitable chlorinated rubber may be produced from raw or vulcanized rubber by dissolving the rubber in a solvent, as carbon tetrachloride, which will be unaffected by chlorine, heating the solution to a temperature within the range 80–110° C. and introducing chlorine into the heated solution. Where vulcanized rubber is treated the sulphur will be separated out by the chlorine, appearing as a chloride of sulphur, all, as for example, is more fully disclosed in U. S. Patent No. 1,852,043 to Deseniss and Nielson.

Other methods for the production of suitably chlorinated rubber are disclosed, for example, in the United States patents to Carlton Ellis No. 1,544,530 and No. 1,544,529, to Peachey No. 1,234,381 and to Deseniss and Nielson No. 1,852,043. It will, of course, be understood that suitably chlorinated rubber for use in connection with this invention may be produced in any desired manner, the references made herein being for illustrative purposes only.

The solvent softener for use in making up compositions in accordance with this invention may be any suitable solvent softener for the chlorinated rubber, that is to say any material which will have a solvent and at the same time a softening or plasticizing effect on the chlorinated rubber. Generally speaking, for example, solvent softeners for nitrocellulose may be used. More specifically the solvent softener may be, for example, dibutyl phthalate, tricresyl phosphate, an alkyl ester of a dibasic aliphatic acid, as methyl cyclohexanyl adipate, methyl cyclohexanyl oxalate, etc., a chlorinated diphenyl, as Aroclor No. 1254, which contains about 54% chlorine, Aroclor No. 1268, which contains about 68% chlorine, or the like, etc.

As illustrative of the practical embodiment of this invention, for example, compositions in accordance with this invention and having various characteristics lending them to use variously in the commercial arts may be made up on the several formulæ contained in the following tables:

Table 1

| | Parts by weight | | | | | | | | | |
|---|---|---|---|---|---|---|---|---|---|---|
| | 1 | 2 | 3 | 4 | 5 | 6 | 7 | 8 | 9 | 10 |
| Chlorinated rubber | 30 | 30 | 30 | 30 | 30 | 30 | 30 | 30 | 30 | 30 |
| Methyl abietate | 60 | | | | | | | | | |
| Hydrogenated ethyl abietate | | 60 | | | | | | | | |
| Chlorinated diphenyl {54% chlorine | | | 60 | 10 | | | | | | |
| Chlorinated diphenyl {68% chlorine | | | | 50 | | | | | | |
| Methyl cyclohexanyl adipate | | | | | 60 | 30 | | | | |
| Methyl cyclohexanyl oxalate | | | | | | | 60 | 30 | | |
| Dibutyl phthalate | | | | | | | | | 60 | |
| Tricresyl phosphate | | | | | | | | | | 60 |

Table 2

| | Parts by weight | | | | | | | |
|---|---|---|---|---|---|---|---|---|
| | 11 | 12 | 13 | 14 | 15 | 16 | 17 | 18 |
| Chlorinated rubber | 30 | 30 | 30 | 30 | 30 | 30 | 30 | 30 |
| Methyl cyclohexanyl adipate | 30 | | 15 | 15 | 15 | 15 | | |
| Raw castor oil | | | 15 | | | | | |
| Raw linseed oil | | | | 15 | | | | |
| Boiled linseed oil | | | | | 15 | | | |
| Raw wood oil | | | | | | 15 | | |
| Boiled wood oil | | | | | | | 30 | |
| Ester gum | 30 | 30 | 20 | 20 | 20 | 20 | | 20 |
| Dibutyl phthalate | | 30 | | | | | | 20 |

In producing compositions according to the above formulæ the ingredients will be blended by heating at a suitable temperature within say, for example, the range 100–120° C. followed by cooling. Of the compositions in accordance with the formulæ in the above tables, for example, No. 4 will be found to be a hard brittle mass at room temperature while Nos. 6 and 8 will be quite plastic and rubbery at room temperature. No. 18 will be a hard tough mass and the remainder will be soft and rubbery.

As will be appreciated the composition may contain more than one solvent softener and as desired or indicated various ingredients in addition to those indicated as essential.

The composition in accordance with this invention may be used generally where a thermoplastic is indicated or desirable and as will be obvious may be formed or molded by the application of heat and pressure.

This application is filed as a division of the application filed by me August 8, 1932, Serial No. 627,990.

What I claim and desire to protect by Letters Patent is:

1. A thermoplastic composition including chlorinated rubber in amount of about 33% to about 50% by weight, an ester of abietic acid and a non-volatile solvent softener in amount of about 50% to about 67% by weight.

2. A thermoplastic composition including chlorinated rubber in amount of about 33–50% by weight, a non-volatile solvent softener in amount of about 50–67% by weight and an abietic acid ester blended together in the presence of heat.

3. A thermoplastic composition including chlorinated rubber in amount of about 33–50% by weight, a non-volatile solvent softener in amount of about 50–67% by weight and an abietic acid ester blended together at a temperature of about 100° C. to about 120° C.

4. A thermoplastic composition including chlorinated rubber in amount of about 33–50% by weight, a non-volatile solvent softener in amount of about 50–67% by weight and a hydrogenated abietic acid ester blended together in the presence of heat.

5. A thermoplastic composition including chlorinated rubber in amount of about 33–50% by weight, a non-volatile solvent softener in amount of about 50–67% by weight and a hydrogenated abietic acid ester blended together at a temperature of about 100° C. to about 120° C.

6. A thermoplastic composition including chlorinated rubber in amount of about 33–50% by weight, a non-volatile solvent softener in amount of about 50–67% by weight and ester gum blended together in the presence of heat.

7. A thermoplastic composition including chlorinated rubber in amount of about 33–50% by weight, a non-volatile solvent softener in amount of about 50–67% by weight and ester gum blended together at a temperature of about 100° C. to about 120° C.

WILLIAM KOCH.